Patented Dec. 11, 1945

2,390,829

UNITED STATES PATENT OFFICE 2,390,829

RUBBER SUBSTITUTE

Joseph H. Elder, Arlington, Tex.

No Drawing. Application September 26, 1942,
Serial No. 459,820

4 Claims. (Cl. 260—752)

My invention relates to the production of materials analogous to rubber and has among its objects and advantages the provision of an improved substitute rubber and method of making the same from vegetable oils containing gums and resinous materials.

In practicing my invention, I make use of pure raw linseed oil and pure pine tar in the proportions of twenty-four ounces and six ounces, respectively. The linseed oil is poured in a small stream into a vessel containing the pine tar. The pin tar is vigorously and thoroughly mixed with a stirring member until all the linseed oil has been added. This mixture is triturated with the stirring member to produce a homogeneous paste like mass in colloid form.

To the paste like mass is added five ounces of carbon black, which is gradually incorporated therein by thoroughly grinding or triturating the mass. The carbon black is added to produce the desired physical body of the product, pigment and texture.

To the mass containing the carbon black is added a solution of carbon disulphide ($CS_2$) and pure gum rubber as an activator to aid the carbon disulphide and the carbon to combine with the gum resin residues of the linseed oil and the pine tar. Fourteen ounces of carbon disulphide and three-fourths to one and one-fourth ounces of pure gum rubber, respectively, are employed. This solution is poured into the paste like mass and is stirred to attain a thorough blending thereof. This blending is preferably done in a cool place and far removed from fire or flame. After blending, the mass is placed in cold storage, a temperature of 45° F. being suitable, to prevent volatilization of the carbon disulphide.

The container or vessel containing the mass is closed tightly and is kept in cold storage for a period of from ten to twelve hours to start the cachoucinizing action of the vegetable gum oils and resins which finally produces a good rubber like product.

The mass is taken from cold storage and is emptied into an open and flat bottomed vessel and is heated to a boiling point. Constant stirring is essential and the bottom of the vessel should be thoroughly scraped and kept in a clean condition to prevent sticking and burning of the mass. The vessel is preferably placed on superheated steam coils which give out sufficient heat to drive off all the unused chemical volatility which may still exist in the form of uncombined carbon disulphide. This heating stage should continue for one and one-half to two hours to throw off the carbon disulphide vapors, after which the vessel may be transferred to an open fire for gradually increasing the temperature.

After boiling the mass for about an hour over the open fire, I add about one ounce of a powdered compound made up of approximately one ounce of hexamethylenetetramine and one and one-half ounces of phenol as an aid in producing more complete cachoucinizing and a preservative effect on the process of rubberizing and to act as a catalyst. The powdered compound is sprinkled over the surface of the light viscous liquid in the vessel and is stirred into the boiling or near boiling liquid. The mass must be stirred constantly and the bottom of the pan should be scraped from its center to the outer margins to prevent sticking and burning of the contents. This heating process eliminates all the oily and greasy substances and results in a residual rubberized or polymerized gum resin. After the powdered compound has been added, additional heat may be employed to keep the liquid boiling lightly for a period of several hours, with continued stirring until all the gases are expelled. Seven or eight hours are usually sufficient, after which more of the powdered compound is added. The mass is then allowed to cool and tests are made as to its viscosity. The mass should now be reduced to about fifty per cent of its original volume and should result in a heavy and stringy viscosity at room temperatures when pulled with the stirring instrument.

When the stringly viscosity condition has been attained, I add one and one-half ounces of zinc oxide and three-fourths of an ounce of strontium oxide freshly calcined and finely powdered to give toughness and body to the mass. The oxides are added at the same time and stirred into the viscous mass while quite hot. Additional heat is applied to bring the mass to a bubbling condition and is continually stirred. The mass is now of a heavy viscous nature even while boiling at a high temperature in the containing vessel. The heat is continued until the total bulk of the mass is reduced to about forty per cent of its original bulk, thereby eliminating oils and greases. The mass is now permitted to cool and further tests are made as to its viscosity and elasticity under room temperatures. At this time the material should be heavy and of a more or less tough and tenacious viscosity when dipped into with the stirring instrument. The material should pull out in long ribbon like strips of from two to three feet or more in length, and also with spider web like threads and rubber hair which will float in the air. The remainder of the powdered compound and three quarters of an ounce of plain flowers of sulphur are mixed together and sprinkled on the surface of the heavy semiliquid mass in the containing vessel. Further stirring is done to mix the powdered compound and the flowers of sulphur with the mass and heat is again applied for one hour, more or less, until all the gases are expelled, at which time an additional one-half ounce of flowers of sulphur are added, stirring continued and more heat applied, for a period of about one hour. The stirring should be vigorous and the bottom of the vessel should be scraped clean. As the mass settles down to a more ropy nature and with all traces of gases eliminated, the mass is permitted to cool. Then at room temperature, three-fourths of an ounce of flowers of sulphur are sprinkled on the surface of the mass and the latter is stirred and again heated with continued stirring to a point where the mass is reduced to a tough dough like condition. The container is then removed from the fire and stirred until it becomes too stiff for further stirring, after which one pint of eighteen per cent ammonia hydroxide is poured into the container to neutralize any excess of nascent activity of the sulphur to prevent its later effects of decomposing or depolymerizing and destroying the rubber like properties of the product. The ammonia hydroxide is permitted to stand over the mass for several hours, after which the latter is washed in a liberal amount of water and run through friction rollers several times. The product is washed each time it is rolled.

The product is now ready for mixing in various proportions with curing materials preparatory to treating the substitute rubber in molds and vulcanizing procedures.

Reclaimed rubber from old vehicle tires may be employed in my product. The old rubber should be reduced to a fine powder and added at the time the gum rubber is added to the mass. By using old rubber, I reduce the amount of gum rubber necessary to make a good product. The reclaimed rubber and the gum rubber may be used in the proportions of fourteen pounds and one pound, respectively.

Without further elaboration, the foregoing will so fully explain my invention, that others may, by applying current knowledge, readily adapt the same for use under various conditions of service.

I claim:

1. A rubber substitute comprising a mixture of approximately twenty-four parts of linseed oil, six parts of pine tar, five parts of carbon black, fourteen parts of carbon disulphide, one part of gum rubber, and two parts of a mixture of hexamethylene tetramine and phenol.

2. A rubber substitute comprising a mixture of approximately twenty-four parts of linseed oil, six parts of pine tar, five parts of carbon black, fourteen parts of carbon disulphide, one part of gum rubber, two parts of a mixture of hexamethylene tetramine and phenol, one and one-half parts of zinc oxide and three-fourths of a part of strontium oxide, two parts of flowers of sulphur, and six parts of ammonia hydroxide.

3. The method of producing a rubber substitute which comprises mixing twenty-four ounces of linseed oil, six ounces of pine tar, five ounces of carbon black, fourteen ounces of carbon disulphide and one ounce of gum rubber, maintaining the mixture at a temperature of approximately forty-five degrees F. for a period of approximately eleven hours, heating the mixture at its boiling point for about two hours, adding one ounce of a powdered compound composed of hexamethylene tetramine and phenol during the boiling operation, and continuing the heat treatment for a period of about seven hours, allowing the mixture to cool to atmospheric temperature, and adding one and one half ounces of zinc oxide and three fourths of an ounce of strontium oxide to the mixture.

4. The method of producing a rubber substitute which comprises mixing twenty-four ounces of linseed oil, six ounces of pine tar, five ounces of carbon black, fourteen ounces of carbon disulphide and one ounce of gum rubber, maintaining the mixture at a temperature of approximately forty-five degrees F. for a period of approximately eleven hours, heating the mixture at its boiling point for about two hours, adding one ounce of a powdered compound composed of hexamethylene tetramine and phenol during the boiling operation, and continuing the heat treatment for a period of about seven hours, allowing the mixture to cool to atmospheric temperature, adding one and one half ounces of zinc oxide and three fourths of an ounce of strontium oxide to the mixture, heating the mixture to a bubbling condition, allowing the mixture to cool and adding three-fourths of an ounce of flowers of sulphur thereto, heating the mixture to its boiling point for a period of about one hour, adding one-half ounce of flowers of sulphur to the mixture and continuing the heating operation for about one hour, permitting the mixture to cool to room temperature and adding three-fourths of an ounce of flowers of sulphur and again heating the mixture, cooling the mixture and adding one point of ammonia hydroxide, and washing the product thus obtained.

J. H. ELDER.